United States Patent [19]

Kesaree

[11] 3,994,351

[45] Nov. 30, 1976

[54] SCALE CONTROLLER

[75] Inventor: Prakash Kesaree, Freeport, Tex.

[73] Assignee: Velasco Scale Company, Inc., Freeport, Tex.

[22] Filed: Jan. 2, 1975

[21] Appl. No.: 538,194

[52] U.S. Cl. ............................... 177/123; 177/165; 177/210

[51] Int. Cl.$^2$ ....................................... G01G 13/02

[58] Field of Search ............. 177/50, 116, 117, 118, 177/64, 210, 45–48, 165; 117/122, 123

[56] References Cited
UNITED STATES PATENTS

| | | | |
|---|---|---|---|
| 1,880,563 | 10/1932 | Weckerly | 177/210 |
| 2,763,457 | 9/1956 | Gregory | 177/117 |
| 3,037,563 | 6/1962 | Allen | 177/4 |
| 3,576,224 | 4/1971 | Sosor | 177/47 |

Primary Examiner—Joseph W. Hartary
Attorney, Agent, or Firm—Arnold, White & Durkee

[57] ABSTRACT

Electrical circuitry and associated mechanical apparatus are combined to provide a non-contactng transducer for adaptation to an existing mechanical scale for adapting the mechanical scale to an electrically controllable scale. The scale movement sensing apparatus is arranged such that there is no frictional or inertial resistance to movement of any of the mechanical scale parts, while providing a continuously variable range over which a scale weight may be sensed.

2 Claims, 6 Drawing Figures

U.S. Patent   Nov. 30, 1976   Sheet 1 of 2   3,994,351
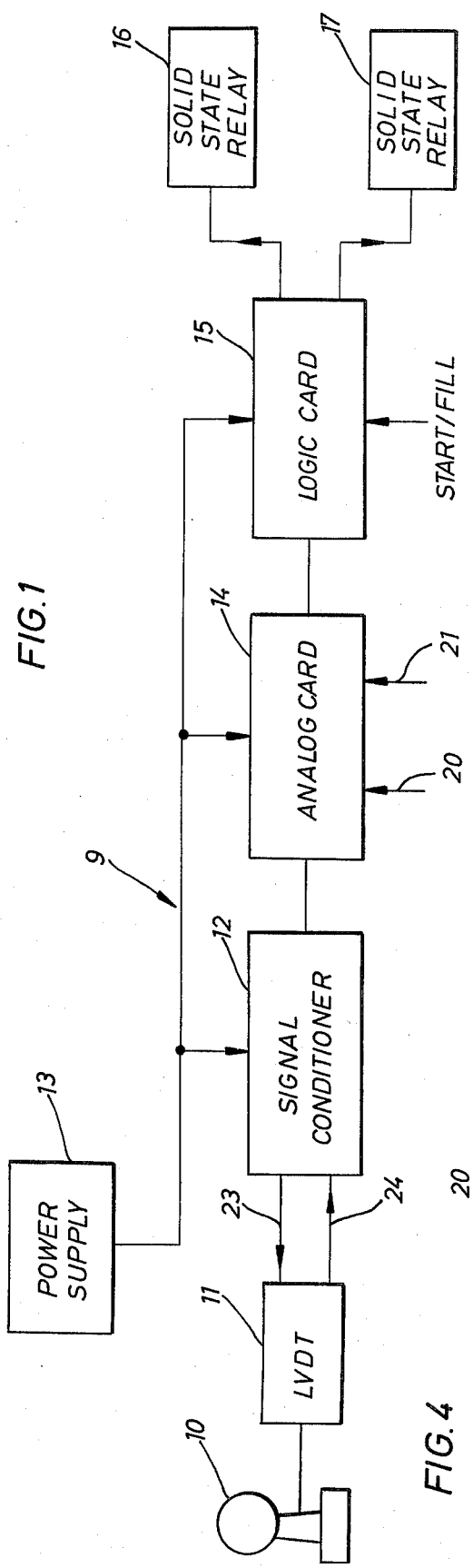
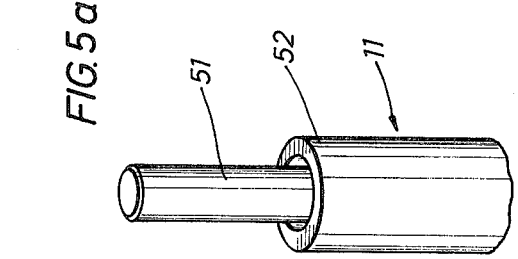
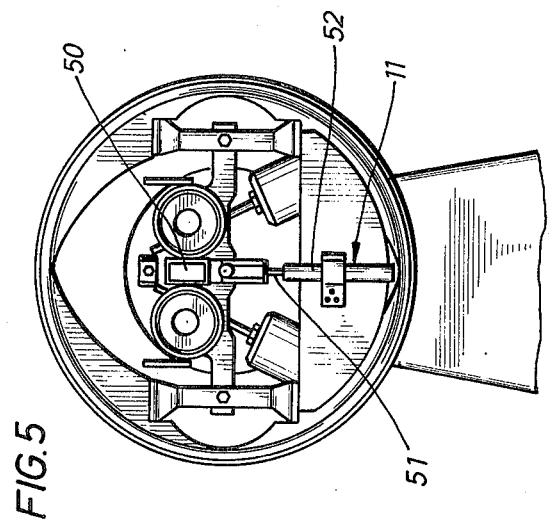
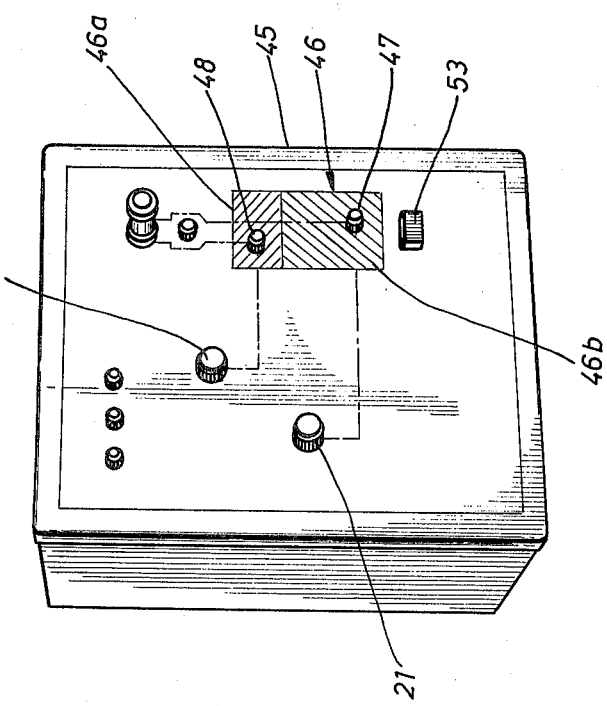

SCALE CONTROLLER

BACKGROUND OF THE INVENTION

There have been many advances in art of electronic control of scale weighing systems. It is desirable to be able to electronically control a scale system, which, for example, may be utilized for the automatic weighing of liquid or granular materials being placed into packaging containers. Further, it is desirable to be able to adapt such an electronic control to a presently existing mechanical scale in order to avoid the expense associated with replacing an item of capital equipment which has not reached the end of its service life. This invention relations to particular electric circuitry and mechanical apparatus utilized for the conversion of a mechanical scale system to an electronically controllable scale system.

It is common, in the conversion of a mechanical scale to one that is automatically controlled by electric circuitry, to replace the entire scale head, a conversion which involves considerable expense. Another popular method of conversion used is to fit a mechanical scale head with a reed switch and magnet. The magnet, being fitted on the scale pointer, may open or close a contact of the reed relay as the pointer passes the switch. Such a system suffers from the inherent limitation of the number of such switch and magnets that can be fitted onto the dial of a mechanical scale. Having a finite number of reed switch and magnet relays necessarily limits the number of points which may be selected for cut-in or cut-off weights for the weighing system.

Another sometimes employed method of converting a mechanical scale to an electronically controllable scale is to mount a device which senses inclination of the internal scale parts on, for example, the fifth lever of the scale, or to cut the steelyard rod and insert a load cell at the opening. A inclinometer or load cell is, of course, a transducer, which must be attached to the electronic circuitry of the scale controller by means of connecting wires. Such an arrangement inhibits the accurate functioning of very sensitive scales since there is usually some contact between the moving parts and the non-moving parts of the scale, at least in the form of the wires which connect the transducer to the circuitry of the controller.

SUMMARY OF THE INVENTION

In accordance with the present invention, there is provided an electronically controllable weighing system which may be used with an existing mechanical scale. Further, the conversion is achieved such that a non-contacting transducer is fitted on a mechanical scale to completely eliminate any contact between moving and non-moving parts of the scale thereby eliminating any possibility of friction impairing the accurate functioning of the scale apparatus. The controller of the present invention may be utilized to control the start and stop points of a fill cycle in the automated filling of containers with a liquid or a granular material. The controller incorporates several safety features, including a fill-cycle initiate switch, operable only when the scale is zeroed, indicating that a container with the correct tare is in position for receiving the materials, and an emergency shut-off switch.

BRIEF DESCRIPTION OF THE DRAWINGS

FIG. 1 is a block diagram showing the mechanical and electrical components in block form illustrating the combination of circuit elements and systems which are employed to produce the desirable results of the present invention.

FIG. 4 is an illustration of one embodiment of the present invention, depicting a typical housing for containing the electrical controls of the present invention.

FIG. 5 is an illustration of the upper portion of a typical pendulum scale.

FIG. 5a is a pictorial diagram of a linear variable differential transducer.

DESCRIPTION OF THE PREFERRED EMBODIMENT

Figure 2:
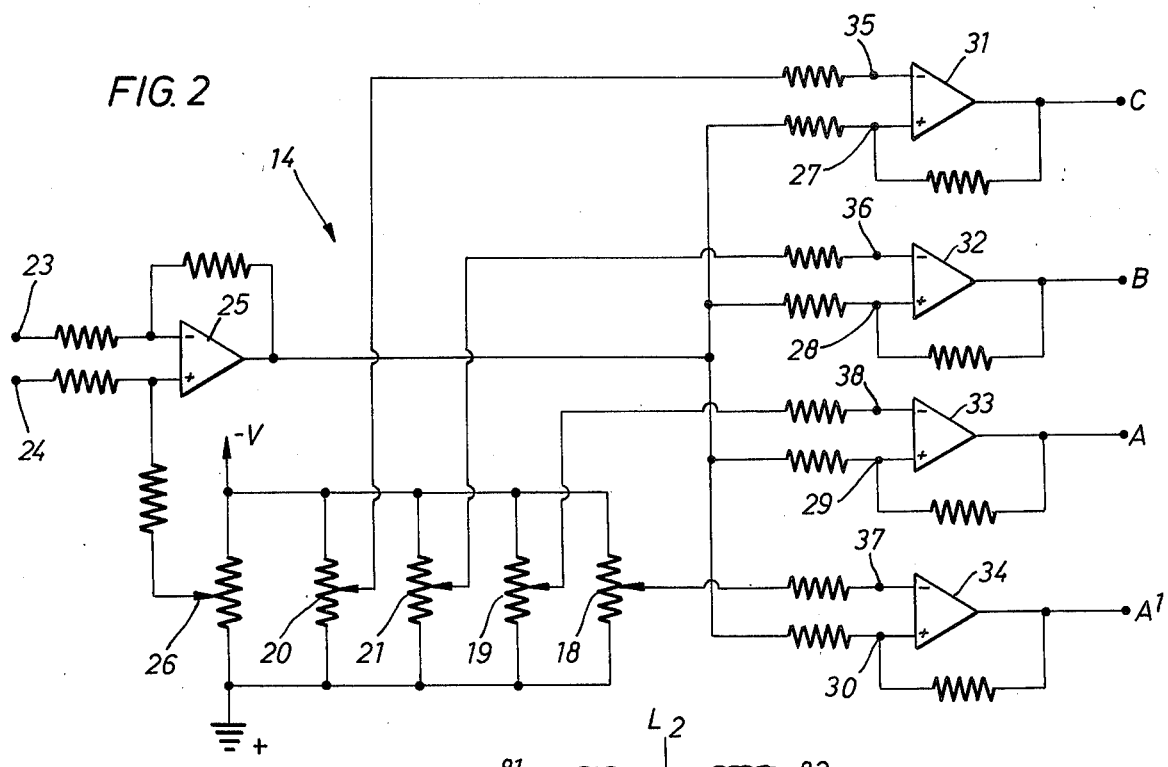
FIG. 2 is a schematic drawing of the analog card illustrated in FIG. 1.

Referring to the drawings, and first to FIG. 1, there is shown a block diagram of the scale controller 9 illustrating the mechanical and electrical system for sensing and producing weight indications of scale loads and controlling a fill operation. The scale controller is shown by way of example in operative association with a load support or platform scale mechanism 10. Such mechanism may be of usual or well-known platform and dial construction having a steelyard arm 50 (FIG. 5) or other mechanism to which a linear variable differential transducer (LVDT) 11 may be affixed. LVDT 11, when displaced from its zero voltage position, generates a signal which is received by signal conditioner 12. The signal conditioner may be one such as the LPM-201 general purpose signal conditioning module, manufactured by Schaevitz Engineering of Pennsauken N.J.

The circuitry associated with analog card 14 is utilized in the controlling of the desired level to which a container is to be filled. Logic card 15 contains digital circuitry for the control of the initiation of the fill operation. Additionally, there is logic circuitry within logic card 15 which prevents initiation of a fill cycle unless certain predetermined conditions are satisfied.

Relays 16 and 17, which derive their output from logic card 15, are auxiliary controls which may be used to control the filling of a container with liquid or granular material. That is, controller 9, when used in combination with a container filling system, serves to operate relays 16 and 17 which in turn accurately control the initiation and duration of a particular fill cycle. The filling system may be of well-known configuration which is amenable to operation and control by relays 16 and 17, as for example the relays may open and close a series of valves which direct the flow of bulk material to a station where a particular container is filled.

LVDT 11 is of standard configuration, and may be one such as the 1000 HR series also manufactured by Schaevitz Engineering. The LVDT generates a differing level of signal output according to the position of the inner barrel along the longitudinal axis in relation to the outer barrel. Power supply 13, when positioned externally from the signal conditioner, may be one such as the Zeltex model number 15AX1001P with triple voltage output. The triple output is desirable for use only in the configuration of the preferred embodiment of the present invention. The requirement for the number of output voltages will differ according to whether a power source is input directly to the signal conditioner, analog card 14 and logic card 15, or input to the signal conditioner with internal transfer circuitry to supply power to the analog and logic circuitry.

The signal conditioner 12 receives its power from an external or internal power supply such as that indicated at 13, and conditions the transducer output into a usable electrical signal proportional to the input signal resulting from scale displacement.

Referring now to FIG. 2, there is illustrated a schematic drawing of the electrical circuitry of analog card 14. The signal conditioner delivers input signals to terminals 23 and 24 which input to operational amplifier 25. Associated with operational amplifier 25 there may be an automatically adjusting potentiometer 26 which functions as a DC offset compensating device. The output from amplifier 25 appears at terminals 27, 28, 29, and 30 of voltage comparators 31, 32, 33, and 34 respectively. At terminal 35 of comparator 31 is the output from potentiometer 20. Analog card 14 receives input information from control means for presetting a desired signal level into the electrical network, and which is implemented by potentiometers 20 and 21, in order to control a fill cycle associated with the filling of an individual container. Potentiometers 20 and 21 may be, for example, ones such as those manufactured by Bourns, Inc. and designated model number 3650. This particular model of potentiometer is of the digital readout type, thus permitting adjustment of the fill level or cut-off point over the entire scale range, the read-out being expressed as a percentage of full scale of the scale dial.

Referring to FIG. 4, the precise function served by potentiometers 20 and 21 is illustrated. On the front of control panel 45 there is illustrated in phantom lines the typical shape of a container being filled under the control of the automatic circuitry of this invention as illustrated at 46. The desired quantity to which the containers to be filled could, of course, be divided into a number of increments; however, in the embodiment of FIG. 4, the "full" condition associated with a container is shown as being divided into upper and lower portions 46a and 46b respectively. Thus, there are two zones associated with the filling of an individual container, a first zone of high flow or fill rate being indicated at 46b and a second zone of reduced fill rate being indicated at 46a. In operation of the device, the desired quantity of material which is to be placed into the individual container, expressed as a percentage of full scale displacement, is set into the system with potentiometer 20, and the desired cutoff point where the fast-fill mode changes to the slow-fill mode is set in by adjusting potentiometer 21. Thus, the scale controller apparatus will release material into a container by way of relays 16 and 17 controlling valves actuators 81 and 82 or other apparatus which direct the flow of bulk material into a container. The fast-fill rate is utilized until reaching the point selected by potentiometer 21, at which time the slow-fill mode of the fill cycle initiates so as to reduce the flow of bulk material to the container, thereby lessening the free fall. Additionally, there is provided indicators 47 and 48 to provide visual indication of the mode of operation of the fill apparatus at any specific time.

Referring again to FIG. 2, it is seen that potentiometer 20 supplies a voltage to terminal 35 of comparator 31. Similarly, potentiometer 21 supplies a voltage to terminal 36 of comparator 32. Comparators 31 and 32, by comparing the signals at the respective input terminals, cause an output level 1 or 0 to appear at terminals C and B respectively.

Potentiometers 18 and 19 supply an input signal to terminals 37 and 38 respectively, of voltage comparators 34 and 33. Potentiometers 18 and 19 are utilized to program a range within which the empty weight or tare weight of an individual container may vary. In one embodiment of this invention, the potentiometers 18 and 19 are internally adjustable, however, it would be obvious to one skilled in the art to provide external controls whereby the scale operator may adjust the range over which the tare weight of an individual container may vary. The comparators 34 and 33, together with additional circuitry which will be explained in detail hereinafter, form a zero-check mechanism. The range over which the tare weight may vary is set, as previously noted, by potentiometers 18 and 19. When a container is placed on a scale the comparators 34 and 33 check to assure the tare weight of the container to be within that range specified. If this condition is not satisfied, the initiate switch 53 (FIG. 3) will not be operable, and material cannot be directed into the container.

Figure 3:
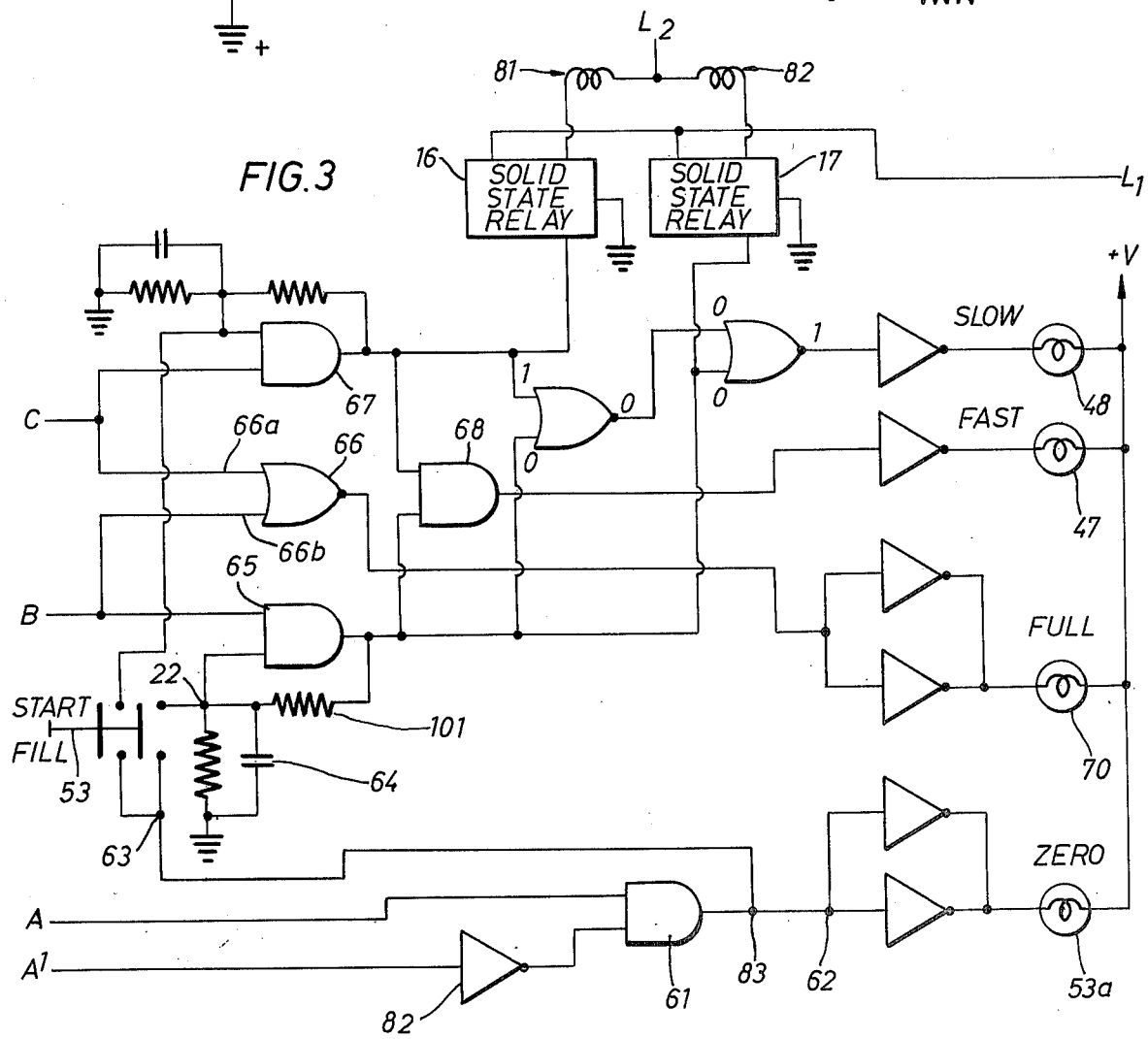
FIG. 3 is an electrical schematic of the logic card illustrated in FIG. 1.

Referring to FIG. 3, there is illustrated the circuitry of logic card 15, with terminals A, A$^1$, B and C corresponding to the terminals of FIG. 2. Essentially, the circuitry associated with terminal C functions to actuate relay 16, which, responding to the input of potentiometer 20, directs the cessation of flow of material to a container when the scale controller senses the desired weight. The circuitry deriving its input from terminal B controls relay 17, or that associated with potentiometer 21 which controls the fast fill portion of the filling cycle. Terminals A$^1$ and A input to logic circuitry which senses the weight of each container, the tare weight, as the containers are placed on the weighing platform. Terminal A will be supplied with a preset voltage level (from potentiometer 19) corresponding to a predicted empty container weight (tare) and terminal A$_1$ will be supplied with a voltage level corresponding to the actual container weight. AND gate 61, receiving input voltages from terminals A and A$^1$, provides that a voltage corresponding to a logical 1 will appear at terminals 83 only when the tare weight condition previously described is satisfied. That is, if the two voltage levels at AND gate 61 do not correspond to a logical 1 confirming actual tare weight to be within the preset range, AND gate 61 will cause a logical 0 to appear at terminals 83 and 63, thereby rendering the initiate switch 53 inoperative. The conditions, when satisfied, cause the logical 1 signal to appear at terminals 83 and 63, cause lamp 53a to light, thereby indicating to the operator that the tare weight conditions are satisfied and the system is ready for initiation of the fill cycle.

In operation there will be a desired weight of material which is to be placed into a container set into the circuitry by manually actuating potentiometer 20 (FIG. 4). This setting may correspond to either a weight in pounds or other convenient units, but in this embodiment is calibrated as a percentage of the full scale value of the mechanical scale dial chart. Next the desired cutoff between the fast-fill and slow-fill portions of the fill cycle is set by manual actuation of potentiometer 21.

An empty container is then placed on the scale platform. In addition to the provision for adjusting the tare weight range previously described, the mechanical scale may have a mechanical tare weight adjust feature, whereby a compensation may be made for deviation of an individual container from the expected tare weight.

The weight signal input to signal conditioner 12 from scale 10 (FIG. 1) is generated by relative position between the inner barrel 51 and the outer barrel 52 of LVDT 11 (FIG. 5a). Referring to FIG. 5 it will be noted that movement of the signal generating apparatus (in this instance the LVDT 11) in no way interfers with the movement of the operative apparatus of the scale. In some adaptations of mechanical scales as previously discussed, it is common to place a mechanicl sensor on arm 50 which senses movement of the arm, thereby transmitting through appropriate electrical circuitry a signal to the scale controller. In order to sense movement of arm 50, and transmit an electrical signal corresponding to such movement from a device adapted to measure the displacement of arm 50, it is necessary to connect the device to electrical circuitry through wires which necessarily must be connected, albeit indirectly, to arm 50. This connection of wires to a movable part of the scale may inhibit the movement of arm 50, thereby providing a distortion of the true weight of the container, particularly in applications where scale displacement is small. It is seen the inner barrel 51 is affixed to arm 50 which moves in the vertical direction in response to an actuation of the scale caused by placing a weight thereon. The outer barrel 52 of LVDT 11 is affixed to any convenient stationary member of the scale head. Since the barrels 51 and 52 are non-contacting there will be no inhibiting of scale movement induced by the displacement sensing member, in this instance, LVDT 11.

After comparing the exact weight of the empty container with the preset tare weight, certain enabling circuitry is activated permitting the operator to initiate the fill cycle by actuating initiator switch 53. Referring to FIG. 3 the enabling circuitry is shown in detail. With a match between the expected and actual weight of the container, AND gate 61 supplies a signal equivalent to a logical 1 to terminal 63. Actuation of fill switch 53 transfers this logical 1 signal to terminal 22. The voltage level appearing at terminals B and C is derived from comparators 31 and 32 which are activated by the slow- and fast-fill potentiometers 20 and 21. There being a signal corresponding to a logical 1 level at terminals B, C, and 63, the AND gates 65 and 67 will hold the output level 1 once the state switch 53 is pressed and released. This in turn will hold relays 16 and 17 in an on-position, thereby energizing feed valve actuators 81 and 82. Additionally, AND gates 68 is activated, causing indicator 47 to energize, thereby providing a visual indication of the active mode of operation. As the weight on the scale increases and crosses the corresponding weight set by potentiometer 21 the logic level at terminal B goes to zero driving the output of AND gate 65 to a zero level, thereby causing relay 17 to move to the off position. At this point only valve actuator 81 is energized, with the system being in the slow-fill mode. Further, deactivation of AND gate 65 deenergizes indicator 47 and energizes indicator 48, again providing visual indication of the mode of operation. The container continues to be filled through the slow-fill mode, with the weight on the scale increasing to the desired level. As the weight approaches that set by potentiometer 20, and crosses that point, the output level of voltage comparator 31 (FIG. 2) goes to 0 causing the AND gate 67 to have one input signal corresponding to a 0 level, thereby causing gate 67 to deactivate which shuts off relay 16 thereby stopping the fill operation.

It will be noted from the circuitry of FIG. 3 that the fill cycle cannot be commenced until the preset tare weight corresponds to the actual weight of the container. This safety consideration prevents an operator from, for example, inadvertently attempting to fill an already full container, a situation which it is imperative to avoid, particularly when the material may be a highly corrosive liquid. More importantly, the system is foolproof in that a fatigued operator is prevented from inadvertently or purposely filling a reject drum which has a tare weight outside the desired tare range.

It will be apparent to those skilled in the art that the precise embodiment of this invention heretofore described may take additional forms. It is not intended that the invention be limited by other than the claims following.

What is claimed is:

1. An apparatus for adapting to a mechanical weighing device for controlling the fill cycle of weighing and filling apparatus for filling a container with a predetermined quantity of material, said apparatus being readily adaptable to an existing mechanically operated weighing device, and comprising:

a two element non-contacting electromagnetically functioning linear variable differential transformer attachable to a moving part of the scale head of a mechanical weighing device by affixing one element of said transformer to the steelyard arm of the mechanical weighing device, said linear variable differential transformer able to measure the relative movement of the steelyard arm, the movement being responsive to a weight being placed on the platform of the weighing device;

an electrical network electrically connected to said transformer for receiving electrical signals from the transformer and converting said signals to usable form, said electrical network comprising:

a signal conditioner;

an analog network connected to said signal conditioner for generating signals initiating a fill cycle, controlling a fast-fill mode thereof, and controlling a slow-fill mode thereof;

a continuously variable control network operatively associated with said analog network for presetting desired signal levels into said analog network for controlling the fast-fill and slow-fill modes of the fill cycle and for presetting desired signal levels representative of a desired range of tare weights, said continuously variable control network including a first potentiometer controlling the fast-fill mode, a second potentiometer controlling the slow-fill mode, and a third and a fourth potentiometer respectively controlling the lower and upper limits of a preset range of tare weights, a logic network connected to said analog network for controlling the initiation of the fill cycle, the fast-fill mode, and the slow-fill mode, said logic network including a switching element connected therein, said switching element being operable only when the actual tare weight of an empty container is within said preset range of tare weights.

2. Apparatus according to claim 1, wherein each of said first, second, third, and fourth potentiometers is a digital readout potentiometer and wherein said switching element is a manually depressible switch.

* * * * *

UNITED STATES PATENT AND TRADEMARK OFFICE
CERTIFICATE OF CORRECTION

PATENT NO. : 3,994,351
DATED : November 30, 1976
INVENTOR(S) : Prakash Kesaree

It is certified that error appears in the above-identified patent and that said Letters Patent are hereby corrected as shown below:

Column 1, line 5, "in art" should read --in the art--;

Column 2, line 66, "15AX1001P" should read --& 15AX1001P--;

Column 4, line 43, "$A_1$" should read --$A^1$--; and

Column 5, line 49, "state" should read --start--.

Signed and Sealed this

Eighth Day of November 1977

[SEAL]

Attest:

RUTH C. MASON
*Attesting Officer*

LUTRELLE F. PARKER
*Acting Commissioner of Patents and Trademarks*